Jan. 25, 1966 T. N. LOWRY ET AL 3,231,683

FERROD GATE SCANNING CIRCUIT

Filed Jan. 11, 1963

INVENTORS T. N. LOWRY
J. E. MACK
H. F. MAY
J. E. SMATHERS

BY Howard R. Popper
ATTORNEY 3,231,683
FERROD GATE SCANNING CIRCUIT

Terrell N. Lowry, New York, N.Y., and John E. Mack, Middletown, Harold F. May, Holmdel, and John E. Smathers, Sea Bright, N.J., assignors to Bell Telephone Laboratories, Incorporated, New York, N.Y., a corporation of New York Filed Jan. 11, 1963, Ser. No. 250,948
19 Claims. (Cl. 179—18)

This invention relates to supervisory circuits for subscriber lines and more particularly to change scanners for determining changes in subscriber line conditions.

It is necessary in the telephone art, as well as in other applications, to determine the condition of a line or scan point. When a telephone is made to go off-hook, the D.C. condition of the line changes. The new condition is detected by scanning equipment, and the central office is notified of a service request. When the telephone is placed on-hook once again, the new D.C. condition of the line controls the scanning equipment to notify the central office that the call has been terminated.

In some telephone systems each line is continuously scanned, and the D.C. condition of the line indicates the on-hook or off-hook state of the subscriber. In other telephone systems however it is neither necessary nor desirable to notify the central office of the state of the line during each scan. All that is required is the knowledge that there has been a change in line condition. In some of these other systems, those employing remote line concentrators, for example, a scanning circuit in the remote unit scans the subscriber lines and transmits to the central office information only as to those lines which have changed condition since the last scan. If for example, during a particular scan only one line has gone off-hook, the identity of only this line need be transmitted to the central office indicating that the central office should register the condition of the line as now off-hook rather than on-hook.

In those telephone systems in which the direct current of the line controls the associated scan point, the scan point voltage determined by the current may be used to forward or reverse bias a diode. The conduction state of the diode is viewed by the scanning equipment to determine the scan point condition. Unfortunately however, the current in each line in the off-hook condition is dependent upon the line resistance and other characteristics individual to each of the lines and is thus somewhat of a "variable constant." The scan point voltage controlling the conduction state of the diode is different for each line in the off-hook condition, and thus if the same scanning circuit is to be provided for each line the circuit must be capable of detecting any voltage within the range determined by the various line characteristics.

It is an object of this invention to provide an improved change-of-condition scanning circuit for telephone lines.

It is another object of this invention to provide a scanning circuit for detecting the direction of change for a changed line condition, that is, whether the associated subscriber has gone from on-hook to off-hook, or vise-versa.

It is still another object of this invention to provide a scanner in which the condition detected is not dependent upon the length of the associated line, or any of the other variables in line characteristics.

Each scan point in the illustrative embodiment of our invention includes the monitoring gate circuit which is fully disclosed in the copending application of J. A. Baldwin, Jr., and H. F. May, Serial No. 26,758, filed May 4, 1960, now Patent 3,175,042, issued March 23, 1965. This monitoring gate circuit is referred to herein by its popular name, "ferrod." The ferrod is a device ideally suited for detecting a line condition even though the line current in the off-hook condition is dependent upon line characteristics. This is due to the fact that the ferrod may be designed to be saturated by the minimum off-hook current in the line.

The ferrod associated with each line in the illustrative embodiment of the invention is scanned to determine the present line condition. A conventional "square-loop" magnetic core is also associated with each line. Each time a ferrod is scanned to determine the present condition of the associated line the associated magnetic core is made to represent this condition. Thus when the next scan is made of the line the state of the magnetic core represents the line condition as determined on the previous scan. A comparison of the present state of the line as represented by the state of the ferrod, and the previous condition of the line as represented by the state of the core enables a changed condition to be detected. Scan pulses are applied to each ferrod-core pair. Each scan pulse sequence includes two successive pulses of opposite polarity. During the application of the first pulse the ferrod and core outputs are compared in such a manner that a change in line condition in either direction is detected. The second scan pulse in each sequence, together with a signal from the ferrod produced during the application of the first pulse, changes the core state to represent the line condition as presently determined.

As will become apparent hereinbelow a change from an on-hook to an off-hook line condition results in neither a change in flux around the ferrod aperture nor a change in flux in the core during the application of the first pulse of the scan pair. A change from an off-hook to an on-hook condition results in a change in flux both around the ferrod aperture and in the core during the application of the first pulse. Thus a change in line condition is detected if the fluxes in both devices associated with the line change directions, or if neither changes direction. If the line condition was previously on-hook and is still on-hook the flux only around the ferrod aperture changes direction. If the line was previously off-hook and is still off-hook the flux in only the core switches. A change in flux direction in only one of the two devices associated with the scanned line indicates that no change in line condition has occurred.

This sequence enables a change of line condition to be detected during the application of the first pulse of each scan pair. The magnetization state of the core is made to represent the line condition as presently determined during the application of the second pulse in each pair. The output pulse from the ferrod during the application of the first scan pulse is delayed, inverted, and applied to the associated core during the application of the second scan pulse to the core. The second scan pulse together with the delayed and inverted ferrod output pulse derived during the first half of the scanning cycle control the magnetization state of the core to represent the present line condition. This technique provides not only a reliable indication of a changed line condition, but in addition advantageous control of the core state in preparation for subsequent scanning.

It is a feature of this invention to provide a plurality of ferrods for representing the instantaneous conditions of a plurality of respective lines and to provide a magnetic core associated with each line for representing the line condition as determined by a previous scan.

It is another feature of this invention to apply two successive scan pulses of opposite polarity to each ferrod-core pair.

It is another feature of this invention to compare ferrod and core outputs during the application of the first pulse in each pair of scan pulses to detect changes in line conditions and the directions of these changes.

It is another feature of this invention to delay and invert the ferrod output arising from the application of the first scan pulse, and to apply it for the duration of the application of the second scan pulse for controlling, together with the second scan pulse, the state of each core to represent the present condition of the associated line.

Further objects, features and advantages of the invention will become apparent upon consideration of the following detailed description in conjunction with the drawing in which.

Figure 1A:
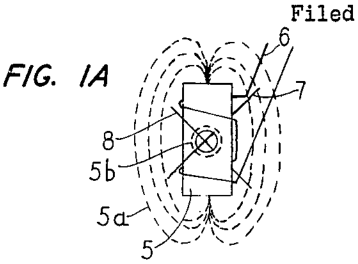
FIG. 1A depicts a ferrod device.

FIG. 1A depicts a ferrod device as disclosed in the above-identified Baldwin-May application. Control conductor 6 is wound on a stick 5 of square-loop material. Because of the air path 5*a*, the stick can be longitudinally saturated by current in conductor 6, but returns to its unsaturated condition when the current is cut off. The circular aperture however defines a closed flux path 5*b* in stick 5, and this closed flux path exhibits remanent switching characteristics. Interrogate conductor 8 and sense conductor 7 pass through the aperture of the stick 5. When no current flows through control conductor 6 a bipolar interrogate signal in interrogate conductor 8 causes the flux about the aperture to switch and reswitch. This oscillation of the flux induces an oscillating signal in read-out conductor 7. If a sufficient current flows through the control conductor however, the longitudinal flux in the stick on both sides of the aperture is of the saturation value. If, for example, the saturated flux on each side of the aperture is in an upward direction, when the bipolar interrogate signal is applied to conductor 8 no flux can be switched about the ferrod aperture. A counterclockwise flux does not appear because the right leg of the stick is already in a saturated condition. A clockwise flux does not appear in the alternate half cycles because the left leg is saturated. Consequently, the interrogate signal causes no flux change in the device, and no read-out signal is induced in conductor 7. Thus when conductor 8 is energized by an interrogate signal an induced signal appears in read-out conductor 7 only if the control conductor 6 of the ferrod is unenergized.

Figure 1B:
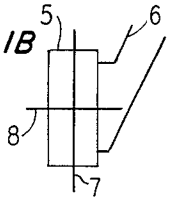
FIG. 1B illustrates the symbolic notation for the ferrod device of FIG. 1A used in FIG. 2.

FIG. 1B illustrates a symbolic notation for the ferrod device of FIG. 1A. Control conductor 6 when connected to energizing potentials controls the saturation of the stick. An interrogate signal applied to conductor 8 causes an induced signal in conductor 7 only if the ferrod is not longitudinally saturated by the current in the control conductor.

Figure 2:
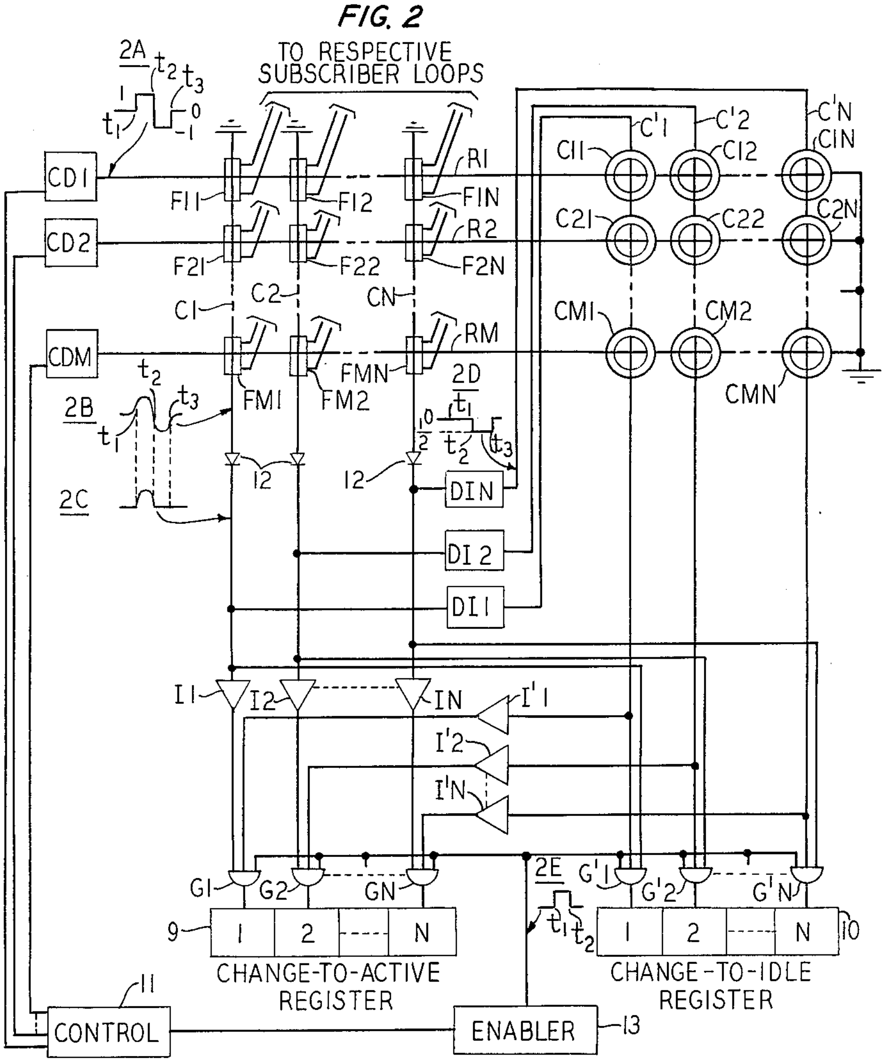
FIG. 2 is a schematic of one illustrative embodiment of our invention.

FIG. 2 is a schematic of one illustrative embodiment of the invention. Each of ferrods F11–FMN is associated with the line circuit of a respective telephone subscriber. The ferrods are arranged in a matrix array having M rows and N columns. The control winding of each ferrod is connected to the loop of the respective subscriber's line circuit. When the subscriber's telephone is on-hook, an idle condition, the respective control conductor has a current through it insufficient to longitudinally saturate the respective ferrod. When the subscriber is off-hook, an active condition, current flows through the control conductor that is sufficient to longitudinally saturate the ferrod. Although the current through each control conductor when the respective telephone is off-hook varies with line length and other characteristics of the particular subscriber loop, the number of turns around each stick is adjusted so that the smallest current arising from an active condition of any line saturates a stick. In this manner the state of each ferrod is dependent only upon the active or idle condition of the associated subscriber line, and is not a function of the particular loop characteristics.

Each line has associated with it, in addition to one of the ferrods, one of the magnetic cores C11–CMN. The state of each core represents the condition of the respective subscriber line as determined on the preceding scan. If a core is in the set condition, having a clockwise flux, the associated line was idle on the previous scan. If the core is reset, having a counterclockwise flux, the associated line was determined to be active during the previous scan.

The interrogate windings of each row of ferrods are serially connected with the corresponding row drive windings of the cores C11–CMN. Unlike conventional magnetic cores having row and column windings, the current pulse applied to the row winding of any core is by itself sufficient to switch the core to one of its remanent states. Current drivers CD1–CDM apply two successive current pulses of opposite polarity to row conductors R1–RM. When current driver CD1 applies the positive interrogate pulse to row conductor R1 (between times $t_1$ and $t_2$) a clockwise flux is set in the flux path around the aperture of each of the ferrods F11–FIN whose respective subscriber line is idle. The pulse applied to row conductor R1 also switches to the set (clockwise flux) state whichever of the first row cores C11–CIN were previously reset. Those of the first row ferrods F11–FIN which have had the circumferential flux set about their apertures induce currents in their respective read-out column conductors C1–CN in the direction to forward bias column diodes 12.

When current driver CD1 applies (between times $t_2$ and $t_3$) the pulse of negative polarity to coductor R1 the flux in the flux path about each aperture that previously was in the clockwise direction is switched to the counterclockwise direction. At the same time, in the absence of any signals on conductors C'1–C'N, the negative pulse on conductor R1 resets each of cores C11–CIN. Diodes 12 block from read-out column conductors C1–CN current that would otherwise be induced by the flux switching about the ferrod apertures between times $t_2$ and $t_3$.

Control 11 determines which of current drivers CD1–CDM interrogates its respective row of ferrods and cores. The positive interrogate pulse initiates at time $t_1$ and terminates at time $t_2$, with the negative pulse immediately following between times $t_2$ and $t_3$, as shown in waveform 2A. The corresponding induced read-out signals on conductors C1–CN passing through the apertures of ferrods associated with idle lines have the pulse shapes shown in waveform 2B. After passing through diodes 12 the read-out signals have the shape shown in waveform 2C.

Delay and inverter units DI1–DIN delay and reshape the pulses passed by diodes 12 during the interval $t_1$–$t_2$, and apply the reshaped pulses to conductors C'1–C'N during the interval $t_2$–$t_3$. The magnitude of the pulses applied to conductors C'1–C'N by the delay units DI1–DIN is more than one half the magnetomotive force necessary to set a column of cores. Those cores which were set during the interval $t_1$–$t_2$ by the positive currents applied to their row conductors will be prevented from being reset during the interval $t_2$–$t_3$ if their column conductors C'1–C'N have the delayed "half-set" currents applied by delay units DI1–DIN.

Stages 1–N of change-to-active register 9 are each associated with one column pair of ferrods and cores. Similar remarks apply to stages 1–N of change-to-idle register 10. Each stage of either register is set when the respective one of gates G1–GN or G'1–G'N is operated. For example, if gate G2 is operated stage 2 of register 9 is set. If the second row of the matrix is being scanned at this time an indication is obtained that the subscriber associated with ferrod F22 and core C22 has gone off-hook since the previous scan, his line having just become active. If stage N of register 10 is also set, the subscriber associated with ferrod F2N and core C2N has gone on-hook since the previous scan, his line having just gone idle. The change information in registers 9 and 10 may be extracted in any of well-known manners.

Each of AND gates G1–GN and G'1–G'N has three input terminals and is operated when positive pulses appear simultaneously on all of them. Control 11 causes enabler 13 to apply a positive pulse between times $t_1$ and $t_2$ to one terminal of each of the gates whenever a row of ferrods and cores is scanned. Inverters I1–IN and I'1–I'N provide positive signals at their outputs if no signals appear at their inputs, and provide no output signals if positive signals appear at their inputs. It is thus seen that during the application of the positive pulse to any scanned row of ferrods and cores, between times $t_1$ and $t_2$, if no signal appears on one of conductors C1–CN and no signal appears on the respective one of conductors C'1–C'N, the respective stage of register 9 is energized. If positive pulses appear on both conductors the respective stage of register 10 is energized. If a positive pulse appears on one of conductors C1–CN and no signal is on the respective one of conductors C'1–C'N, or a positive pulse appears on one of conductors C'1–C'N and no signal appears on the respective one of conductors C1–CN, the respective stages in registers 9 and 10 are not energized.

The method of interrogating each ferrod as to the present state of the associated line and the respective core as to the previous state of the line, as well as the manner in which the core is set or reset in accordance with the present line condition, is conveniently summarized in the table below. A core must be set with a clockwise flux (CW) whenever the associated line is idle. It must be reset with a counterclockwise flux (CCW) whenever the line is active. When the line associated with a ferrod in the row being scanned is idle the ferrod output is positive between times $t_1$ and $t_2$, and the associated delayed and inverted output is negative between times $t_2$ and $t_3$. These conditions are represented respectively by the "+" and "−" designations in the table. A "0" designation indicates that the line is active, the ferrod is longitudinally saturated and produces no output between times $t_1$ and $t_2$, and the respective delay unit provides no output between times $t_2$ and $t_3$. When a core is switched from the reset to the set state by the first scan pulse in any pair a positive pulse appears in the respective one of conductors C'1–C'N. This condition too is represented by a "+" notation in the table. If the core is already in the set state prior to the first scan pulse, no pulse appears in the respective conductor C'1–C'N, represented by a "0" in the table.

TABLE

| | | | | |
|---|---|---|---|---|
| Previous line condition | idle | idle | active | active. |
| Previous core state | set (CW) | set (CW) | reset (CCW) | reset (CCW). |
| Present line condition | idle | active | active | idle. |
| Ferrod output ($t_1$–$t_2$) | + | 0 | 0 | +. |
| Delay output ($t_2$–$t_3$) | − | 0 | 0 | −. |
| Core output ($t_1$–$t_2$) | 0 | 0 | + | +. |
| Core state ($t_1$–$t_2$) | set (CW) | set (CW) | set (CW) | set (CW). |
| New core state ($t_2$–$t_3$) | set (CW) | reset (CCW) | reset (CCW) | set (CW). |

The circuit is best understood by considering each of the four possibilities in turn. These four cases comprise a previously idle line which is now still idle, or has changed to active, and a previously active line which is still active, or now changed to idle. Although in the following description the subscriber line associated with ferrod F11 and core C11 is used for illustrative purposes, similar remarks apply to each of the other ferrod-core pairs associated with the other subscriber lines.

If the line associated with ferrod F11 and core C11 was previously idle there is a clockwise flux in core C11, this flux having been set during a prior scan. If the line is still idle the positive pulse applied to conductor R1 between times $t_1$ and $t_2$ causes a positive pulse to appear in the ferrod conductor C1. The positive scan pulse merely drives the set core flux further into saturation and since the core flux is not switched no pulse is induced in conductor C'1 during time $t_1$–$t_2$. Because no signal appears on conductor C'1 during interval $t_1$–$t_2$ inverter I'1 supplies a positive signal at its output. Gate G1 is not operated however, because the inverter I1 causes the positive pulse at its input to be inverted, and thus no signal is applied from inverter I1 to gate G1. Consequently, stage 1 of register 9 is unenergized. Stage 1 of register 10 also is not energized even though one terminal of gate G'1 has a ferrod output pulse applied to it because no signal is applied to conductor C'1 between times $t_1$ and $t_2$ due to core C11 not being switched. As stage 1 of neither register is energized it is determined that the condition of the line associated with ferrod F11 and core C11 has not changed since the previous scan.

When the negative pulse is applied to conductor R1 between times $t_2$ and $t_3$ the negative pulse which appears in conductor C1 is blocked by the diode 12. Delay and inverter unit DI1 however, provides a negative pulse to conductor C'1 between times $t_2$ and $t_3$ due to the positive induced pulse in conductor C1 between times $t_1$ and $t_2$. The negative pulse on conductor C'1 between times $t_2$ and $t_3$ inhibits core C11 from resetting due to the negative pulse applied by current driver CD1. As a result core C11 remains in the set state with a clockwise flux. Gates G1–GN and G'1–G'N in no circumstance operate between times $t_2$ and $t_3$ as enabler 13 enables these gates only between times $t_1$ and $t_2$. It is thus seen that if a line is still idle the associated stage of register 9 and the associated stage of register 10 remain unenergized, and the respective core remains set.

If the line which was previously idle becomes active ferrod F11 now becomes longitudinally saturated. Between times $t_1$ and $t_2$ a positive pulse is no longer induced in conductor C1 and no signal appears on conductor C'1 because core C11 remains in its previously set condition. Inverter I1 applies a positive signal to one input of gate G1, and inverter I'1 applies a positive signal to another input of gate G1. This gate operates and energizes stage 1 of register 9. This is an indication that the subscriber associated with ferrod F11 and core C11 has just gone off-hook. Gate G'1 does not operate because positive pulses appear in neither of conductors C'1 and C1.

When the negative pulse is applied to conductor R1 between times $t_2$ and $t_3$, as ferrod F11 is saturated, no signal appears at the output of delay and inverter unit DI1. The negative pulse in conductor R1 now resets core C11, the inhibiting magnetomotive force on conductor C'1 not appearing between times $t_2$ and $t_3$ as it does when the line is still idle. Consequently, core C11 is reset with a counterclockwise flux between times $t_2$ and $t_3$ to now indicate that the associated line is active.

If the line was previously active core C11 is reset with a counterclockwise flux. If the line is still active when the positive scan pulse is applied to conductor R1, delay and inverter unit DI1 receives no input between times $t_1$ and $t_2$ as ferrod F11 is saturated. As a result the output of unit DI1 is unenergized between times $t_2$ and $t_3$. The positive pulse on conductor R1 sets core C11 and induces a positive signal in conductor C'1 between times $t_1$ and $t_2$. Gate G'1 is unenergized however as no signal appears on conductor C1. Gate G1 also remains unenergized as inverter I'1 applies no signal at its output as a result of the positive signal in conductor C'1. Stage 1 in register 9 and stage 1 in register 10 are not energized, the line condition not having changed.

However core C11 is now in the set condition and must be reset to indicate that the line is still active. The negative pulse on conductor R1 between times $t_2$ and $t_3$ resets core C11 as no inhibiting potential appears at the output of unit DI1 during this interval. Thus after interrogation core C11 is still in the reset condition. The core is set and then reset, but the respective register stages are not energized during the interrogation sequence.

If the line was previously active but has become idle prior to the present scan, both the ferrod aperture flux and the core flux switch on the first positive pulse of the scan, and the delayed negative pulse provided by delay and inverter unit DI1 prevents the core from being reset by the negative scan pulse. During time $t_1$–$t_2$, gate G1 is unoperated because inverters I1 and I'1 invert the signals on conductors C1 and C'1. Gate G'1 operates due to the positive signals appearing on both conductors C1 and C'1. Stage 1 of register 10 is energized to indicate that the line associated with ferrod F11 and core C11 is now idle. Core C11 is set between times $t_1$ and $t_2$, and must remain set to now indicate the on-hook condition of the line. The negative reset pulse on conductor R1 between times $t_2$ and $t_3$ does not reset core C11 as the inhibiting negative potential at the output of unit DI1 prevents core C11 from resetting between times $t_2$ and $t_3$.

It is thus seen that each pair of scan pulses applied to any row of ferrods and cores not only effects the comparison of the present conditions of the lines with their previous conditions, but in addition, controls the new states of the cores to represent the present line conditions. Only change information appears in the two registers 9 and 10. Groups of lines are successively scanned as control 11 sequentially energizes current drivers CD1–CDM. The circuit is independent of line variables. The ferrod windings are adjusted to saturate respective ferrods for the minimum control winding current obtained for an off-hook or active line.

In accordance with certain aspects of our invention, components other than the disclosed ferrod-core pairs may be utilized in other embodiments of our novel combination. For example, "transfluxers" or similar closed flux-path devices may be substituted for the ferrods of FIG. 2, provided however that auxiliary circuits for periodically unblocking them are employed. Thus, it is to be understood that the above-described arrangement is illustrative of the application of the principles of the invention. Numerous other arrangements may be devised by those skilled in the art without departing from the spirit and scope of the invention.

What is claimed is:

1. A scanning circuit for indicating changes in the condition of a telephone line comprising a monitoring device connected to said line; a magnetic core having two stable remanent magnetization states; current drive means for applying first and second successive pulses of opposite polarity to said monitoring device and to said core, each of said pulses being of sufficient magnitude to switch the magnetization state of said core; first read-out means connected to said monitoring device operable in response to the application of said first current pulse when said line is in a first but not a second condition; means responsive to said first read-out means for applying a signal to said core during the application of said second current pulse for inhibiting the switching of the magnetization state of said core; second read-out means coupled to said core operable in response to the switching of the magnetization state of said core; means responsive to the operation of both of said read-out means during the application of said first current pulse for indicating a change in said line from said second condition to said first condition; and means responsive to the nonoperation of both said read-out means during the application of said first current pulse for indicating a change in said line from said first condition to said second condition.

2. A scanning circuit for indicating changes in the condition of a telephone line comprising a monitoring device connected to said line; a magnetic core having two stable remanent magnetization states; means for applying a first magnetomotive force to said monitoring device for interrogating said monitoring device and to said core for switching the magnetization of said core to a first state, and for applying a second magnetomotive force to said core for switching the magnetization of said core to a second state; first read-out means coupled to said monitoring device operable responsive to the application of said first magnetomotive force when said line is in a first but not a second condition; means responsive to said first read-out means for inhibiting said second magnetomotive force from switching the magnetization of said core; second read-out means coupled to said core operable responsive to the switching of the magnetization of said core; means responsive to the operation of both of said read-out means during the application of said first magnetomotive force for indicating a change in said line from said second condition to said first condition; and means enabled in the absence of the operation of both of said read-out means in response to the application of said first magnetomotive force for indicating a change in said line from said first condition to said second condition.

3. A scanning circuit for indicating changes in the condition of a telephone line comprising a monitoring device connected to said line; a magnetic core having two stable remanent magnetization states; means for applying a first magnetomotive force to said monitoring device for interrogating said monitoring device and to said core for switching the magnetization of said core to a first state, and for applying a second magnetomotive force to said core for switching the magnetization of said core to a second state; first read-out means coupled to said monitoring device responsive to the application of said first magnetomotive force when said line is in a first rather than a second condition; means responsive to said first read-out means for inhibiting said second magnetomotive force from switching the magnetization of said core; second read-out means coupled to said core responsive to the switching of the magnetization of said core; and means responsive to the relative operations of both of said read-out means for detecting a change in said line from said first condition to said second condition and from said second condition to said first condition.

4. A scanning circuit in accordance with claim 3 further including means for enabling said detecting means to operate only during the application of said first magnetomotive force.

5. A scanning circuit for indicating changes in the condition of a telephone line comprising circuit means connected to said line and controlled by first and second conditions of said line; memory means for representing the condition of said line as determined on each scan; interrogating means for simultaneously interrogating both said circuit means and said memory means; means responsive to the interrogation of said circuit means and said memory means for detecting a change in said line from said first condition to said second condition and from said second condition to said first condition; and means including said interrogating means and said circuit means for controlling said memory means to represent the present condition of said line.

6. A scanning circuit in accordance with claim 5 wherein said circuit means is a ferrod device and said memory means is a magnetic core.

7. A scanning circuit in accordance with claim 6 wherein said ferrod device includes a sense conductor and said controlling means includes means connected to said sense conductor responsive to signals in said sense conductor for applying a magnetomotive force to said magnetic core to control the magnetization of said core in accordance with the present condition of said line.

8. A scanning circuit for detecting changes in a monitored element from a first to a second condition and from said second to said first condition comprising circuit means connected to said monitored element and controlled by the condition of said monitored element; memory means; means connected to said circuit means and said memory means for interrogating said circuit means and said memory means; means for comparing changes in said circuit means and said memory means responsive to said interrogating means for detecting a change in said monitored element from said first condition to said second condition or from said second condition to said first condition; and means responsive to changes in said circuit means as a result of the operation of said interrogating means, together with said interrogating means, for representing in said memory means the present condition of said monitored element.

9. A scanning circuit in accordance with claim 8 wherein said interrogating means applies a two-phase signal to said circuit means and said memory means, and means for controlling the operation of said comparing means only during the first phase of said signal.

10. A scanning circuit in accordance with claim 9 wherein the first phase of said two-phase signal controls said memory means to represent said first condition and the second phase of said two-phase signal controls said memory means to represent said second condition, and wherein said representing means prevents said second phase of said two-phase signal from representing in said memory means said second condition when said monitored element is in said first condition.

11. A scanning circuit for indicating changes in the conditions of a plurality of telephone lines comprising a plurality of monitoring devices each associated with and responsive to the conditions of a respective one of said lines; a plurality of magnetic cores each having two stable remanent magnetization states and each associated with a respective one of said lines; said monitoring devices and cores being arranged in respective matrix arrays, each monitoring device in a row of the monitoring matrix array being associated with a core in a corresponding row of the core matrix array for each of said lines, current drive means for selectively applying first and second successive pulses of opposite polarity to said rows of monitoring devices and cores, each of said pulses being of sufficient magnitude to switch the magnetization states of said cores; a plurality of first read-out means each connected to one of said columns of monitoring devices responsive to the application of said first current pulses to monitoring devices whose associated lines are in a first condition; means responsive to said first read-out means for applying signals to respective ones of said columns of cores during the application of said second current pulses for inhibiting the switching of the magnetization states of said cores; a plurality of second read-out means each coupled to one of said columns of cores responsive to the switching of the magnetization states of said cores; means responsive to the operations of respective pairs of said first and second read-out means during the application of said first current pulses for indicating changes in said lines from a second condition to said first condition; and means responsive to the nonoperation of both said first and second read-out means in respective pairs during the application of said first current pulses for indicating changes in said lines from said first condition to said second condition.

12. A scanning circuit for indirecting changes in the conditions of a plurality of monitored elements comprising a plurality of circuit means individually connected to respective ones of said monitored elements and controlled by first and second conditions of said monitored elements; a plurality of memory means each associated with one of said circuit means for periodically representing the condition of the respective one of said monitored elements; said circuit means and said memory means being arranged in pluralities of corresponding columns, interrogating means for interrogating rows of said circuit means and said memory means; means connected to each of said pluralities of corresponding columns and responsive to the interrogation of said circuit means and said memory means for detecting changes in said monitored elements from said first condition to said second condition and from said second condition to said first condition; and means including said interrogating means and said circuit means for controlling said memory means to represent the conditions of the respective ones of said monitored elements.

13. A scanning circuit in accordance with claim 12 wherein each of said circuit means is a ferrod device and each of said memory means is a magnetic core.

14. A scanning circuit in accordance with claim 13 further including a plurality of sensing means individually connected to columns of said ferrod devices, and wherein said controlling means includes means connected to said sensing means responsive to signals in said sensing means for applying magnetomotive forces to said magnetic cores to control the magnetizations of said cores in accordance with the conditions of said respective monitored elements.

15. A circuit comprising a plurality of remanent switching magnetic cores, a plurality of saturable monitoring transformers, means for applying first and second polarity flux switching pulses each respectively to switch the remanent states of said cores and to induce currents in said transformers, means for saturating said transformers to prevent said currents being induced, means responsive to said induced currents for inhibiting the switching of said cores, first register means operative during said first of said switching pulses when both said currents are induced and said magnetic cores are switched, and second register means operative during said first of said switching pulses when neither said currents are induced nor said magnetic cores are switched.

16. A circuit for indicating changes in condition of a plurality of lines comprising a plurality of rows of saturable transformers, said transformers each having a flux switching aperture, a plurality of rows of remanent switching magnetic cores, each of said magnetic cores being associated with one of said saturable transformers, means for selectively applying first and second polarity flux switching pulses serially through rows of said transformers and rows of said magnetic cores, a plurality of means including said saturable transformers responsive to said first polarity flux switching pulses for inhibiting the switching of associated ones of said magnetic cores responsive to said second polarity flux switching pulses, means for saturating said saturable transformers selectively to inhibit said inhibiting means, first register means operative during the application of said first polarity flux switching pulses responsive to the switching of fluxes in associated saturable transformer apertures and magnetic cores for indicating a change-to-idle condition of any of said lines, and second register means operative during the application of said first polarity flux switching pulses for detecting when flux in neither of associated saturable transformer apertures nor magnetic cores switch to indicate the change-to-busy condition of any of said lines.

17. A scanning circuit for indicating changes in the conditions of a plurality of telephone lines comprising detection means including a plurality of apertured remanent saturable monitoring transformers; memory means including a plurality of remanent magnetic cores; single interrogating means for simultaneously interrogating the states of said detection means and said memory means; output means for comparing the states of said detection and said memory means; and means responsive to the outputs of said detection means for thereafter determining the states of said memory means.

18. A scanning circuit in accordance with claim 17 wherein said detection means comprises a matrix of said transformers arranged in rows and columns; said memory means comprises a matrix of said cores arranged in rows and columns; and wherein said interrogating means includes a plurality of pulsing means each series connected to a row of said transformer matrix and a row of said core matrix.

19. A scanning circuit in accordance with claim 18 wherein the transformers and cores of said matrices are similarly disposed, each transformer in the one matrix corresponding to and being similarly positioned to a core in the other matrix.

No references cited.

ROBERT H. ROSE, *Primary Examiner.*